April 13, 1943. J. W. CARMAN 2,316,502
RIM AND ATTACHING MEANS FOR PNEUMATIC TIRES
Filed May 26, 1941 2 Sheets-Sheet 1
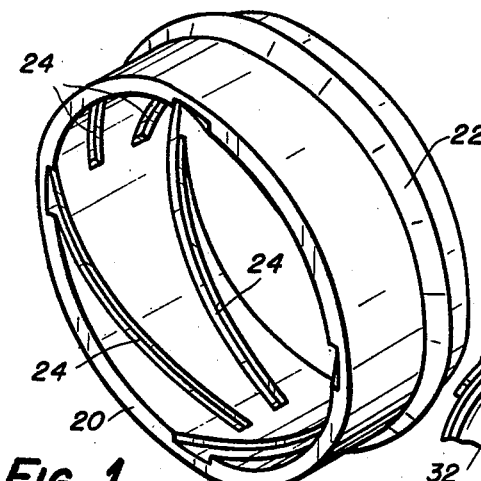
FIG_1
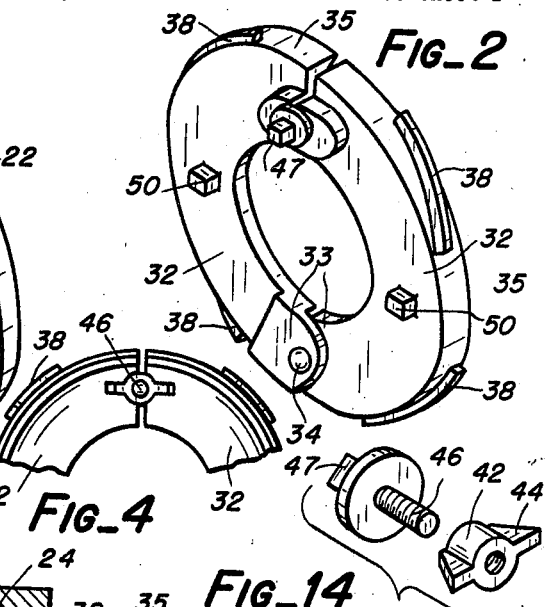
FIG_2
FIG_4
FIG_14
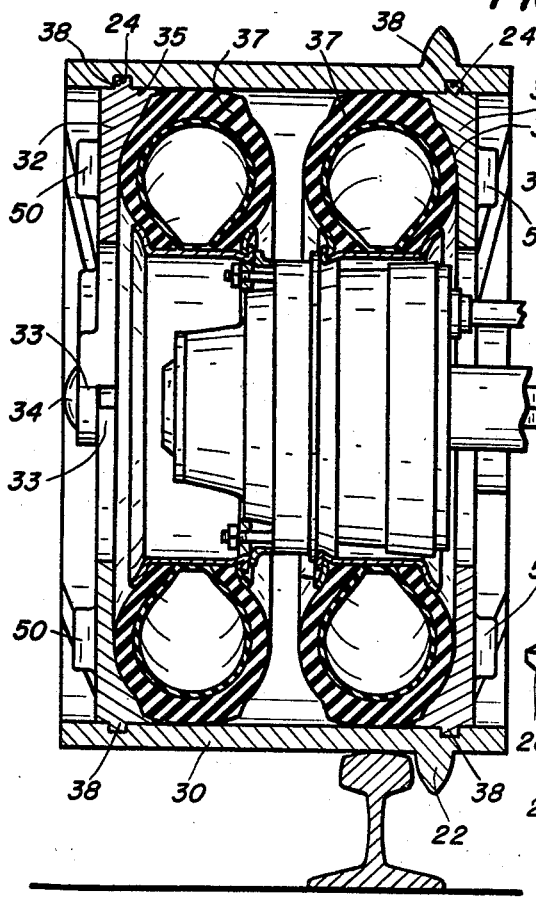
FIG_8
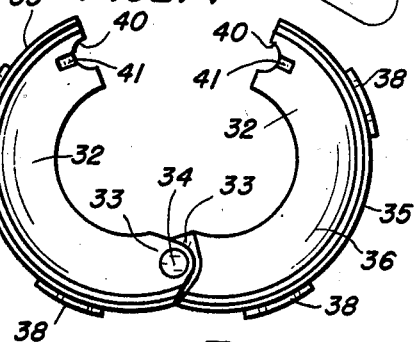
FIG_3
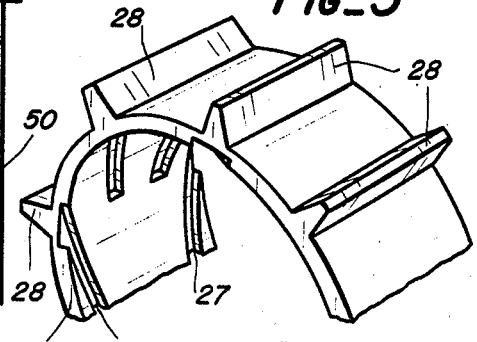
FIG_5
INVENTOR
James W. Carman
BY
Smith & Tuck
ATTORNEYS

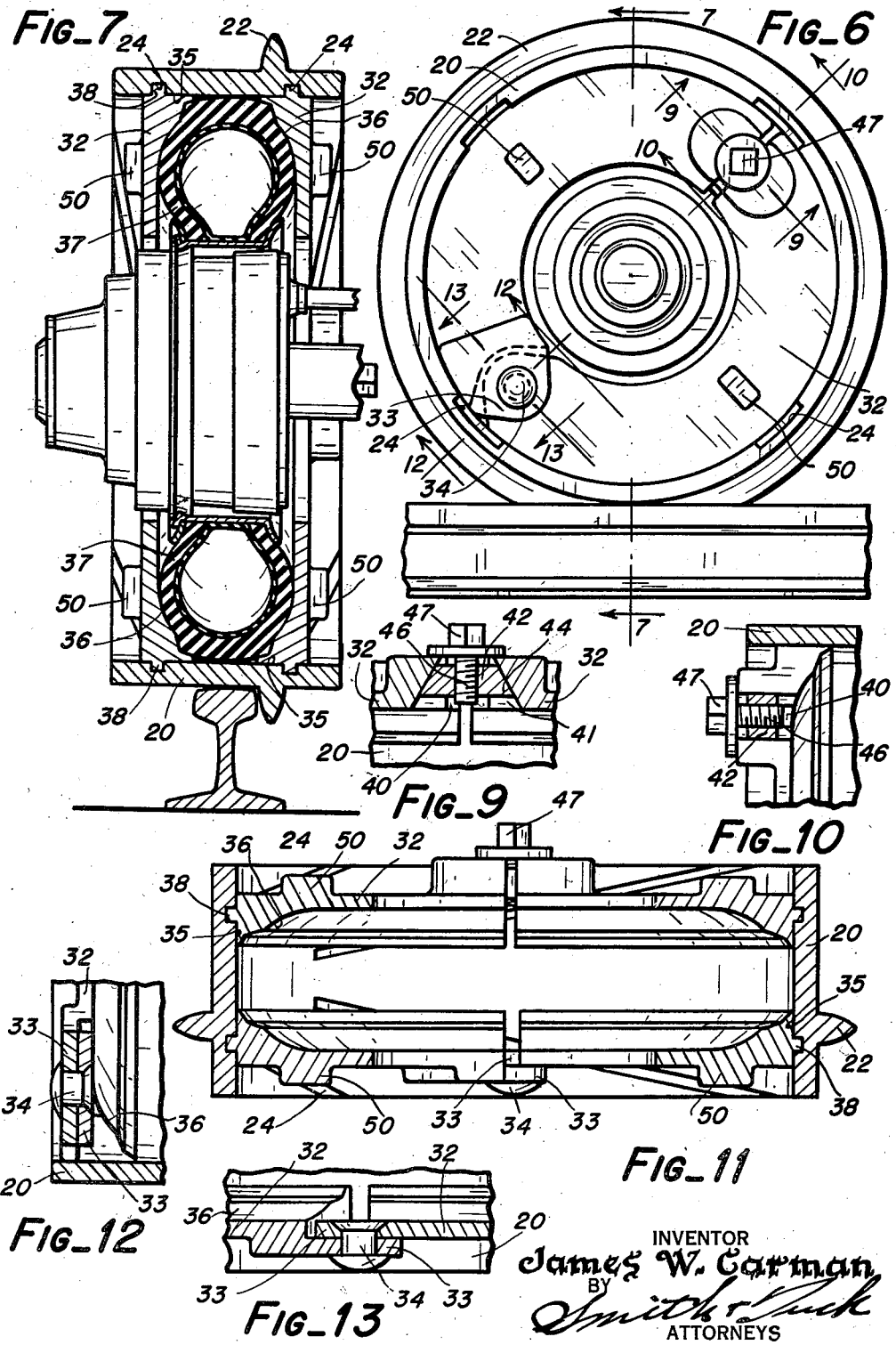

Patented Apr. 13, 1943

2,316,502

UNITED STATES PATENT OFFICE 2,316,502

RIM AND ATTACHING MEANS FOR PNEUMATIC TIRES

James W. Carman, Seattle, Wash.

Application May 26, 1941, Serial No. 395,168

7 Claims. (Cl. 295—8.5)

This invention relates to a rim and attaching means for pneumatic tires and is adapted to be demountably attached to a rubber or pneumatic tire of a conventional motor vehicle. There has been a long-felt need and desire for the provision of a rim that may be readily attached to or detached from pneumatic tires so that the vehicle can be operated upon a railroad track in which case the rim would be provided with a flange or so that the vehicle could be operated over extremely difficult conditions with relation to the terrain in the manner of a cleated tractor in which case the rim should be provided with ground-engaging cleat means.

In the present development of vehicular traffic, extremely large machines have been produced. An ideal use of my invention may be to employ it in adapting these vehicles with means whereby they may be run on the rails of a standard railroad railbed and operated as a locomotive. While most railroad track rails are provided with a uniform spacing throughout the country, which is a standard gauge of 4 ft. 8½ inches, the various types of pneumatic tired vehicles are not always provided with equally spaced wheels so that the same demountable rim usable upon one particular spacing of wheels in connection with a track-engaging flanged rim, would not operate upon a vehicle having wheels spaced variously from those of the other vehicle. It is therefore desirable that such a demountable rim having a flange may be provided with means for securing it to the wheel of a pneumatic-tired vehicle in various spaced apart adjusted positions with relation to said flange.

An important object of my invention relates to the provision of a rigid rim adaptable to be attached to pneumatically tired wheels to provide that wheel with either a flange or cleated rim.

Another object of my invention has been the provision of a demountable rim for pneumatic tires which may be secured to said tires at various lateral positions with relation thereto.

A further object of my invention has been to provide tire gripping means for demountable rims that are readily installed and removed from the pneumatic tire and employ the principle of the screw thread to adjust them laterally in said rim with relation thereto.

Still another object of the invention has been the provision of means which may be manually operated to securely lock the tire gripping means in an adjusted position within said rim.

A still further object of the invention has been the provision, in a demountable rim for pneumatic tires, of a novel method for the attachment of demountable rims to pneumatic tires.

Other objects and advantages of the invention will be apparent during the course of the following description, and in the accompanying drawings forming a part of this specification and in which like reference numbers refer to like parts throughout the same.

Figure 1 is a perspective view of a flanged rim according to the principles of my invention, Figure 2 is a perspective view of a lock member that is associated with the rim of Figure 1 in mounting the rim on a pneumatic tire, showing the device in the closed position, Figure 3 is an elevational view of the device of Figure 2 but showing the hinged members in the open positions, Figure 4 is a fragmentary elevational view of the inner face of the device of Figure 2 showing expanding lock means employed therewith, Figure 5 is a fragmentary perspective view of an alternative form of rim employed in my invention, in this case showing the rim as being provided with cleats, Figure 6 is a view in elevation of a pneumatic tire having the rim and locking means of my invention associated therewith and said wheel mounting for rolling engagement upon a conventional rail, Figure 7 is a vertical sectional view taken on line 7—7 of Figure 6, Figure 8 is a vertical sectional view similar to Figure 7, but showing in cross-section a dual tired wheel and axle arrangement, Figure 9 is a fragmentary sectional view taken on line 9—9 of Figure 6, Figure 10 is a fragmentary sectional view taken on line 10—10 of Figure 6, Figure 11 is a cross-sectional through the rim and locking means of my invention similar to the showing of Figure 7, but omitting the pneumatic tired wheel and axle appearing therein, Figure 12 is a fragmentary sectional view taken on lines 12—12 of Figure 6, Figure 13 is a fragmentary sectional view taken on line 13—13 of Figure 6, Figure 14 is a bracketed view of the expander bolt and nut employed in locking or otherwise securing the adjustable gripping means within the rim.

The numeral 20 designates a rim having an annular flange 22 on its outer face intermediate its edges. In the inner face of the rim I provide pairs of converging spirally cut grooves 24 that are each a portion of a screw thread. In the case of the showing of Figure 1 four opposed pairs of thread portions are employed.

In Figure 5 a rim 26 having the grooves 27 is provided with exterior lateral grousers or cleats 28 in spaced apart relation around the outer surface of the rim. The diameter of the rim internally is equal to substantially the external tread diameter of an inflated tire with which it is to be associated. The thickness and width can vary according to the ground conditions to which the rim will be subjected.

To all intents and purposes the rim 30 of Figure 8 is the equivalent of the rim 20 shown in Figure 7 and elsewhere throughout the drawings. That is true with the exception that the width of the rim is sufficient to accommodate it to dual tired wheels, rather than the single tired wheel of the other showing.

A locking member, illustrated in perspective in Figure 2, comprises a pair of substantially semi-circular arms 32, 32 having ears 33 that are pivotally joined together by means of the pin 34. The rim portions 35 of the arms 32 are substantially wider than the body portion in one direction or to one side. They overhang the plate of the body and, by means of the curved surfaces 36, conform to the outer side faces of the tire 37.

Spaced apart from each other around the periphery of the rims 35 are a plurality of tongues or thread segments 38 that are angularly disposed across the face of the rim in a manner conformable to the pitch of the groove portions 24. The ends of the arms 22 opposite the pivot at the pin 34 are notched at 40 and have the angular grooves 41 adjacent those notches. An expander nut 42, by means of its curved body, fits with reasonable accuracy in the notch halves 40 and the angularly shaped wings 44 each engage in a groove 41 adjacent one or the other of the notch halves. The bolt 46 is threadedly engaged in the nut 42 and by means of a bolt head 47 may be turned to draw the nut laterally between the ends of the arms 32 to expand them slightly and impart a "bind" to the locked members of Figure 2.

In assembling and mounting a rim on a wheel, a pair of the devices of Figure 2 are employed, one to engage the inner face of the tire and one to engage the outer face of the tire. Each of these members, by means of the tongue 38 which may be engaged in the thread portions 24, are to be laterally adjusted within the rim in the manner disclosed in Figures 7 and 11 according to the predetermined desired lateral positioning of the rim with relation to the tire. This is employed in the case of the flanged rim wherein the flange must be accurately placed so that the vehicle upon which the device is mounted can be accommodated to the gauge of the rails on which it would be operated.

For convenience in tightening or loosening the lock members on the outer face of each arm, I provide a boss or lug 50 which is so positioned that it may be conveniently manually struck by use of a hammer to rotate the locking member with relation to the rim in either direction.

I practice the assembly of my invention with relation to pneumatic tires in the following manner, a first step is to jack the vehicle wheel off the ground to raise the tread of the tire sufficiently so that the rim may be inserted thereunder. I customarily deflate the tire sufficiently to permit the rim 20, 26, or 30 to be slipped thereover and manually adjusted in the substantially correct or desired lateral position. The locking member for the inner face of the tire has its arms spread so that the center open portion of the semi-circular arms can be brought around the axle housing brake operating mechanism or whatever means and devices may be connected with the inner face of the wheel brake drum or the like. The tongues 38 are inserted into the inner matching thread portions and the whole device rotated sufficiently so that through the instrumentality of the spiral of the thread, the entire member will be drawn up against the inner tire face as shown in Figure 7, for example.

The bolt 46 can next be turned to expand the arms 32 securely and tightly into engagement in the spiral grooves to prevent accidental dislodgement or other movement that would misalign the tire rim at a critical time.

In a similar manner the outer locking member is inserted and adjusted so that the two sides of the tire are properly engaged to position the device with relation thereto. In such instances where the tire has been deflated, it must be reinflated and, of course, it will be apparent that by thus reinflating the tire and making it rigid and firm, it will tend to lock the assembled device on the wheel.

The foregoing description and the accompanying drawings are believed to clearly disclose a preferred embodiment of my invention, but it will be understood that this disclosure is merely illustrative and that such changes in the invention may be made as are fairly within the scope and spirit of the following claims.

I claim:

1. A demountable rim for pneumatic tires comprising a hollow cylindrical rim having inner opposed segmental thread elements arranged adjacent each edge, a pair of circular locking members each having segmental thread elements mating with thread elements of the rim to position said rim about a pneumatic tire between said members, each said locking member comprising a pair of substantially semi-circular arms pivoted together at one end and having expander means between the other ends whereby to expand said members to bind them in the rim when the thread elements are engaged together.

2. A demountable rim for pneumatic tires comprising a hollow cylindrical rim having inner segmental thread elements arranged adjacent each edge, a pair of circular locking members each having segmental thread elements mating with thread elements of the rim to position said rim about a pneumatic tire between said members, each said locking member comprising a pair of substantially semi-circular arms pivoted together at one end and having expander means between the other ends whereby to expand said members to bind them in the rim when the thread elements are engaged together.

3. A demountable rim for pneumatic tires comprising a hollow cylindrical rim having an inner thread element arranged adjacent each edge, a pair of circular locking members each having a thread element mating with a thread element of the rim to position said rim about a pneumatic tire between said members, each said locking member comprising a pair of substantially semi-circular arms pivoted together at one end and having expander wedge between the other ends, a draw bolt in said wedge and resting on said arms whereby to expand said members to bind them in the rim when the thread elements are engaged together.

4. A demountable rim for pneumatic tires comprising a hollow cylindrical rim having an inner thread element arranged adjacent each edge, a pair of circular locking members each having a thread element mating with thread element of the rim to position said rim about a pneumatic tire between said members, each said locking member comprising a pair of substantially semicircular arms pivoted together at one end and having an expander wedge between the other ends whereby to expand said members to bind them in the rim when the thread elements are engaged together.

5. A demountable rim for pneumatic tires comprising a hollow cylindrical rim having an inner thread element arranged adjacent each edge, a pair of circular locking members each having a thread element mating with a thread element of the rim to position said rim about a pneumatic tire between said members, each said locking member comprising a pair of substantially semicircular arms pivoted together at one end and having expander means between the other ends whereby to expand said members to bind them in the rim when the thread elements are engaged together.

6. A demountable rim for pneumatic tires comprising a hollow cylindrical rim having an inner thread element arranged adjacent each edge, a pair of circular locking members each having a thread element mating with a thread element of the rim to position said rim about a pneumatic tire between said members, each said locking member comprising a pair of substantially semicircular arms pivoted together at one end in circular form and including an expander wedge between the other ends whereby to expand said members to bind them in the rim when the thread elements are engaged together.

7. A demountable rim for pneumatic tires comprising a hollow cylindrical rim having an inner thread element arranged adjacent each edge, a pair of circular locking members each having a thread element mating with a thread element of the rim to position said rim about a pneumatic tire between said members each said locking member comprising a circular disc having an edge slit and including an expanded wedge in said slit whereby to expand said member to bind it in the rim when the thread elements are engaged together.

JAMES W. CARMAN.